Aug. 23, 1927. 1,640,050
W. NICHOLAS
RUBBER TUBE TRIMMING, WRAPPING, AND ROLLING MACHINE
Filed July 18, 1923 4 Sheets-Sheet 2
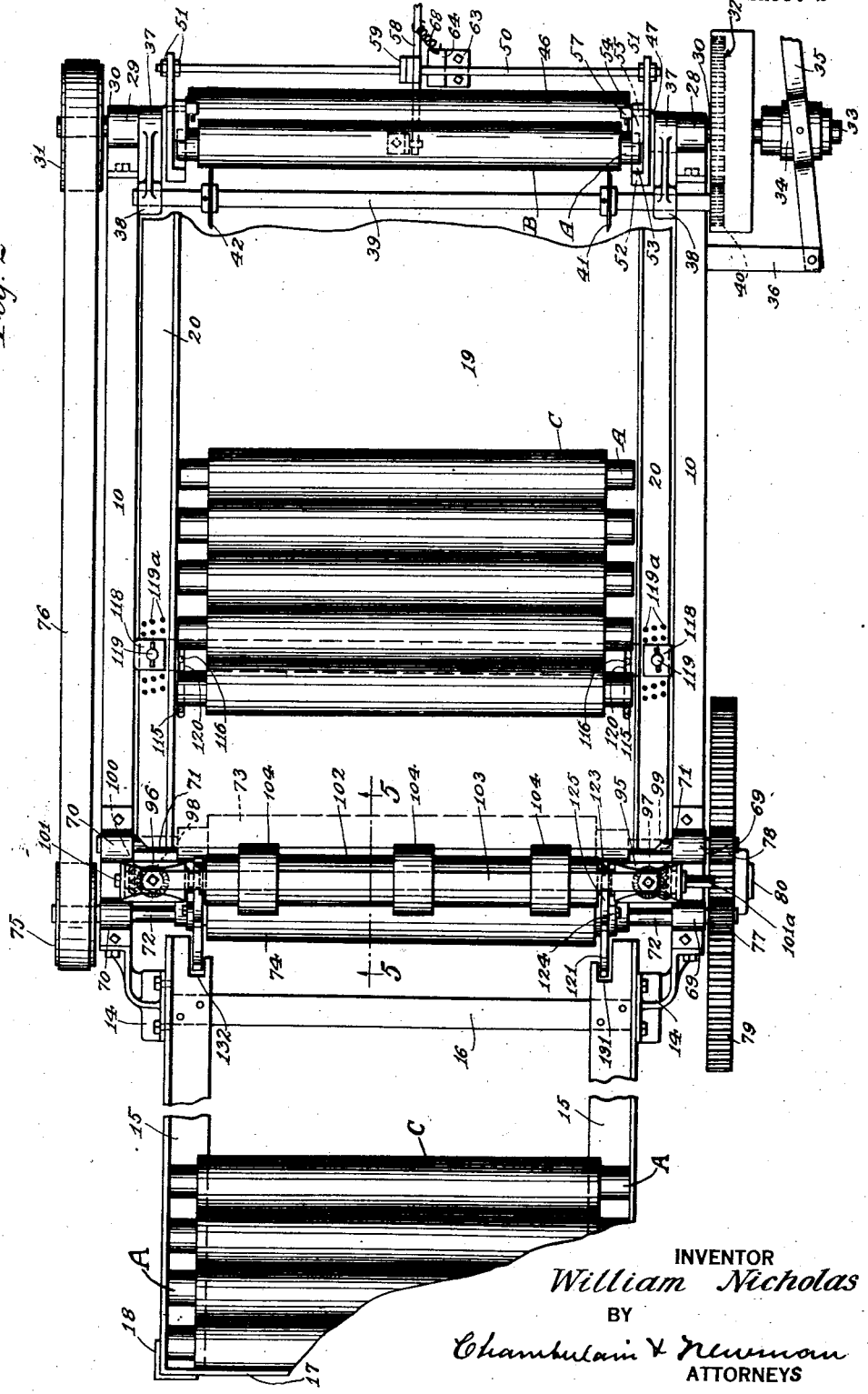
INVENTOR
William Nicholas
BY
Chamberlain & Newman
ATTORNEYS

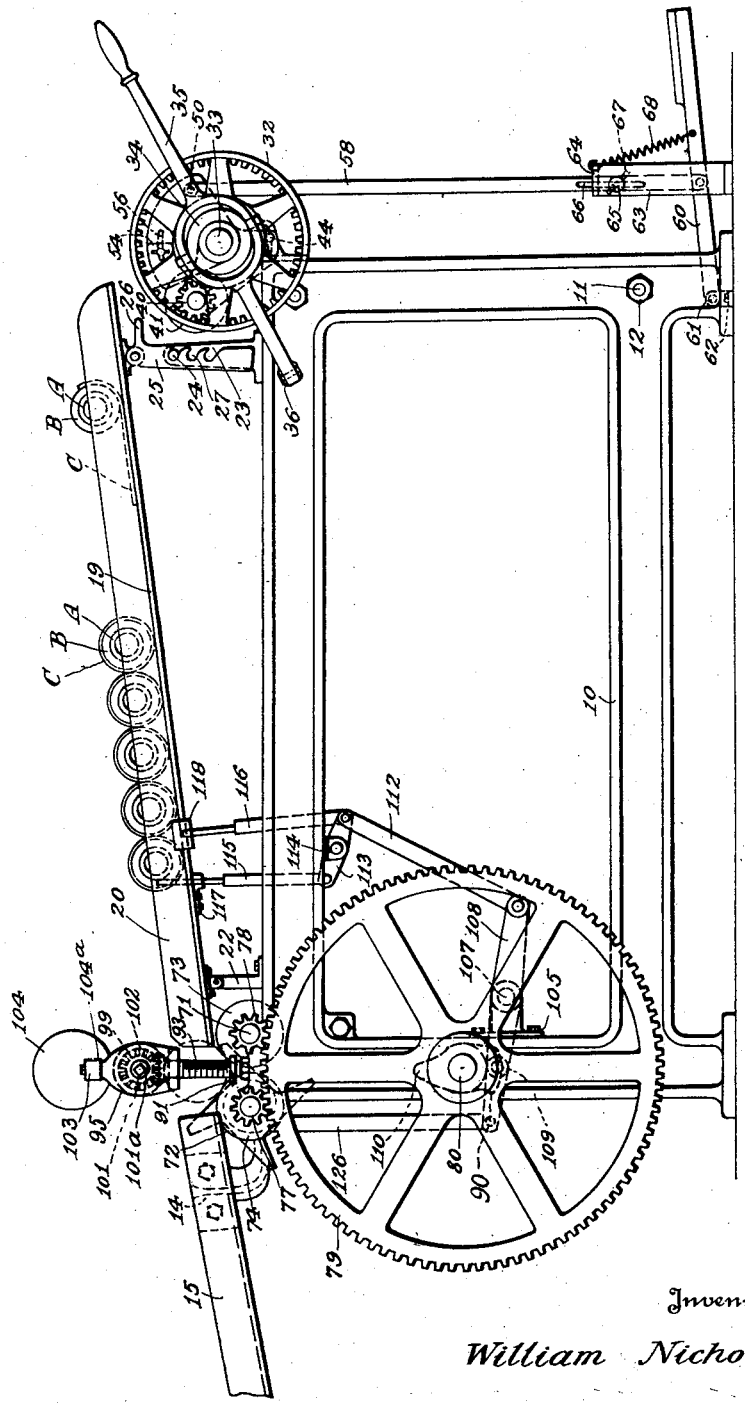

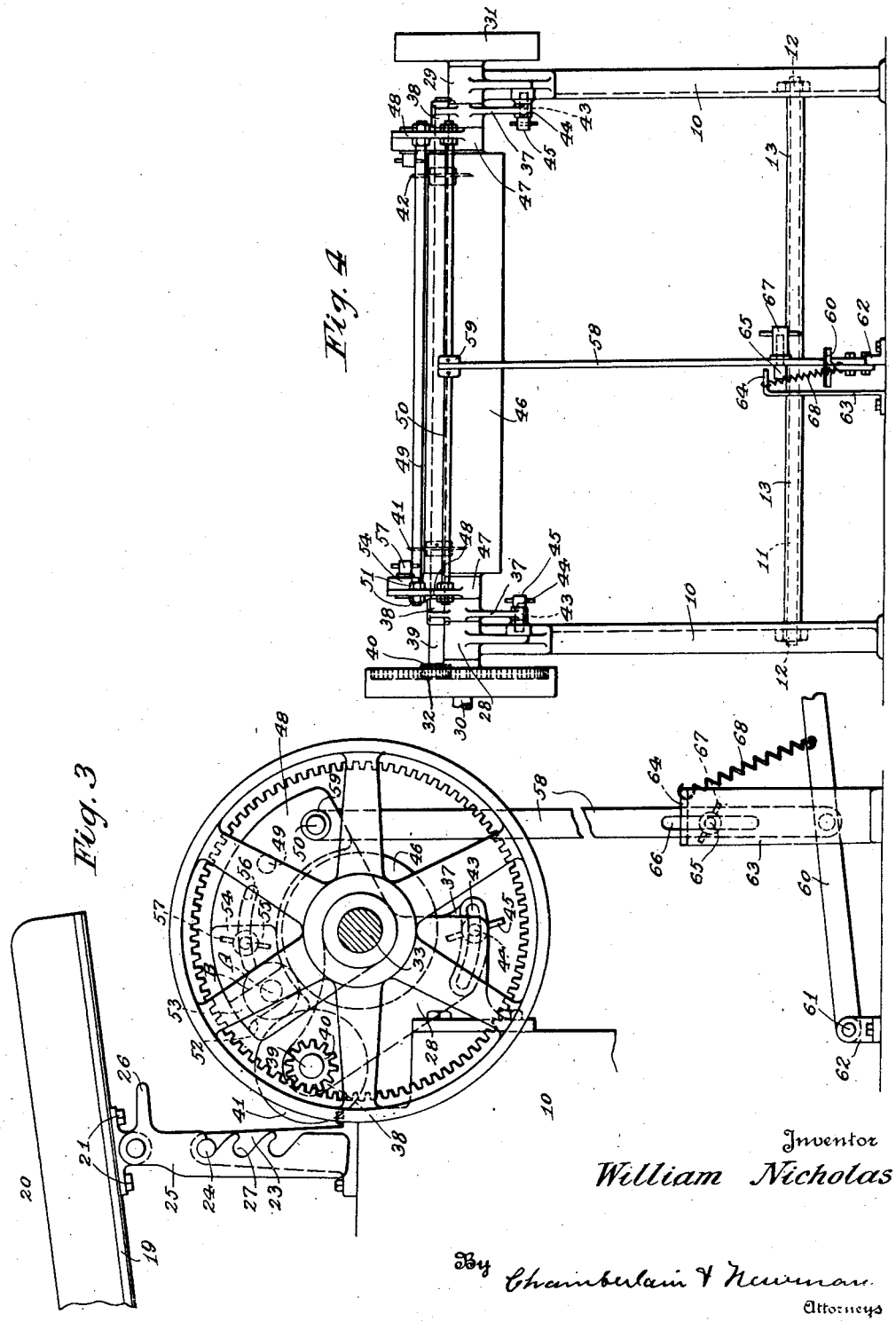

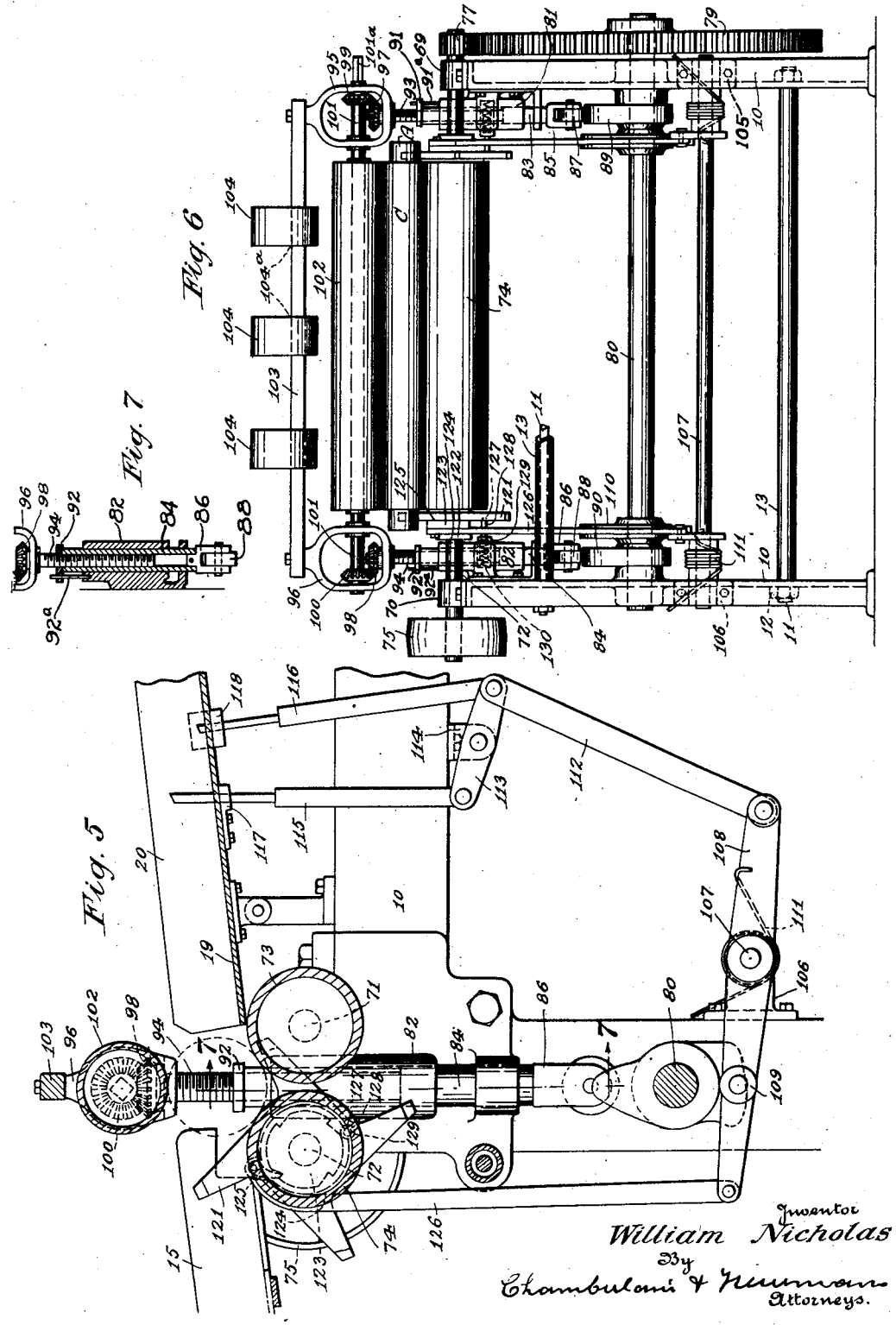

Patented Aug. 23, 1927.

1,640,050

UNITED STATES PATENT OFFICE.

WILLIAM NICHOLAS, OF BRIDGEPORT, CONNECTICUT, ASSIGNOR TO THE BLACK ROCK MANUFACTURING COMPANY, OF BRIDGEPORT, CONNECTICUT, A CORPORATION OF CONNECTICUT.

RUBBER-TUBE TRIMMING, WRAPPING, AND ROLLING MACHINE.

Application filed July 18, 1923. Serial No. 652,267.

This invention relates to new and useful improvements in rubber tube trimming, wrapping and rolling machines, such as are employed in wrapping uncured rubber tubes, from which jar rings or solid circular pieces or other forms of cut rings are made.

In the art of making rubber jar rings and other circular pieces and rubber bands, it is first necessary to form relatively long rubber tubes which are made on other types of rubber machines, such for instance as extruding machines, that serve to form plastic rubber stock into tubes which are formed and supported upon mandrels. These tubes are obviously formed of various sizes and lengths according to the particular class of rings to be cut therefrom.

The object of the invention therefore is to provide a machine which is adapted to trim off the uneven end portions of these roughly formed tubes, while supported upon mandrels, and to provide means for rolling the trimmed tubes after wrapping in a piece of cotton cloth, and then to roll the tube between rapidly driven calendering rolls which compresses the rubber stock against the mandrel, and furthermore tightly wraps the cloth around the stock, preparatory to the vulcanizing process which is performed after the tubes leave this machine.

A further object of the invention is to provide adjustable cutters whereby tubes of different diameters and lengths may be trimmed and whereby all tubes of a like kind can be cut to exactly the same length.

We also provide means for receiving and supporting the rubber tubes preparatory to their rolling operations, and provide in connection with said storage, a means for automatically feeding one roll at a time therefrom to the calendering rolls where the tubes are rolled for a given length of time, and further to provide in connection with said calender rolls a device for ejecting the rolled tubes therefrom when complete.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification and upon which:

Fig. 1 is a side elevation of the machine according to the present embodiment of my invention, a portion at one end being broken away;

Fig. 2 is a plan view also partially broken away;

Fig. 3 is an enlarged detail side elevation of the forward end of the machine, and showing the tube trimming mechanism;

Fig. 4 is a front elevation of the machine;

Fig. 5 is an enlarged detail vertical sectional view of the central portion of the machine, taken along the line 5—5 of Fig. 2, and showing the rolling mechanism and the mechanism for releasing and ejecting the tubes;

Fig. 6 is a rear elevation of the machine, the tube supporting rack being detached therefrom; and Fig. 7 is a detail sectional view of the adjustable support for the pressure roll, being taken along the line 7—7 of Fig. 5.

Referring in detail to the characters of reference upon the drawings, and more particularly to Fig. 1, 10—10 represents side members of a frame that are tied together in spaced relation to each other by means of fixed rods 11 having nuts 12 on their outer threaded ends that serve to clamp both of said side members against the ends of tubes 13, through which the rods extend. Brackets 14—14 (Fig. 2) are secured to the rear end of the uprights 10—10, and support a downwardly inclined frame consisting of side angle bars 15—15, a connecting strip or bar 16 at the inner end, and a channel bar 17 at the outer end, and which outer end is supported upon legs 18—18.

An inclined table 19 is adjustably mounted upon the frame so as to be given more or less pitch from front to rear, its rear edge being spaced from the inner end of the frame 10. Side flanges consisting of angle bars 20—20 are secured to the sides of the table by bolts 21. At its inner end the table is hingedly supported in spaced relation to the frames 10 upon brackets 22, while at its outer end it is adjustably supported by means of two part posts at each side, each consisting of an upright 23 secured to the side frames 10 and provided with a pin 24, and a dog 25 pivotally secured to the under side of the table and provided with a handle portion 26 and a series of upwardly inclined pockets or recesses 27, one of which is adapted to be engaged with the pin 24 to support the table at the desired inclination. At the front upper corners of the frame there are secured bearing brackets 28 and 29 in which is journaled a shaft 30 provided at one end with a pulley 31 and at its other end with an internal gear 32, and driven by a drive shaft 33 to which it may be connected or disconnected by a clutch 34, adapted to be operated by a handle 35 pivotally mounted upon a bracket 36 supported upon the side frame.

Adjacent and at the inner sides of the brackets 28 and 29 a pair of rotatably adjustable members 37 are mounted upon the shaft 30, and have journaled in the radially extending bearing portions 38 thereof a cutter shaft 39 provided at one end with a pinion 40 meshing with the internal gear 32, and in spaced relation between the members 37 with a pair of circular cutting knives 41 and 42. The members 37 are furthermore provided with arcuate slots 43 respectively engaged by threaded posts 44 secured upon the brackets 28 and 29, and provided with wing nuts 45, adapted by tightening against the sides of the slotted portions of said members to fix them in their adjusted relation. This construction enables the cutting knives to be adjusted circumferentially about the shaft 30.

A cylindrical roll 46 is mounted upon the shaft 30 to rotate therewith, and between its ends and the members 37 there are mounted upon the shaft a pair of rotatable work carriers including hub portions 47 and segmental radially projecting portions 48, having a pair of tie rods 49 and 50 extending between them and connected at their ends to said portions 48 by pairs of nuts 51 engaging the threaded ends of the rods. An inwardly extending flange 52 is formed upon the inner ends of the portions 48; and in spaced relation thereto, and providing radial pockets 53 at the inner sides of the members, there are provided blocks 54 adjustable toward and away from the flanges by means of a bolt 55 therein engaged in a circumferential slot 56 of the segmental portion 48, and having a winged nut 57 thereon for securing the block upon said portion. The pockets 53 are adapted to receive the ends of the mandrel A upon which the rubber tube B is mounted, the latter resting upon the roll 46 so that it is rotated thereby, and may be moved through rotation of the work carrier members into and out of relation to the rotating cutter knives, so that the ends of the tube will be trimmed thereby. The adjustability of the pockets as to width, permits different sized mandrels to be inserted therein, the knives being also circumferentially adjustable toward and away from the mandrel, as before pointed out.

The movement of the mandrels and the tube thereon into and out of relation with the cutting knives is brought about by foot-operated mechanism. The tie rod 50 has connected at its center the upper end of a bar 58, the lower end of which is pivotally connected at 59 to a foot lever 60 pivoted at 61 to upon a bracket 62. A fixture 63 is secured to the floor and is provided at its upper end with a flange 64 acting as a stop for a pin 65 secured in a slot 66 of the bar by a wing nut 67, and normally held in engagement with the flange by a spring 68 tied between the fixture and the foot lever. This spring serves to move the mandrel into engagement with the cutting knives and to hold the tube B yieldably in engagement therewith during the cutting operation, the engagement of the stop pin 65 with the flange 64 determining the depth of the cut. By adjustment of the pin the depth of the cut may be regulated as desired. When it is desired to remove one of the mandrels and place another in position, the operator depresses the foot lever, thereby moving the work carrier and the mandrel supported thereby away from the cutting knives. The mandrel with the trimmed tube thereon is then placed upon the inclined table, which serves as a work table upon which the cloth covering is started upon the rubber tubes by hand and finished by rolling down the table by gravity. This wrapping process is performed by spreading a sheet of wet canvas C (Fig. 1) upon the table and after aligning the tube with the top edge portion of the canvas, the tube starts to roll by gravity down the table, at the same time covering itself with the canvas during its passage until it is stopped by engagement with the previously wrapped tubes held in place upon the table by means of automatically releasable stop means, hereinafter more fully referred to. The foremost tube when released rolls into operative relation with rolling mechanism.

In suitable bearings 69 and 70 at the inner ends of the frames 10—10 there are journaled a pair of parallel shafts 71 and 72, (Figs. 1 and 2), having rolls 73 and 74 mounted respectively thereon, the shaft 72 having a pulley 75 upon its projecting end, which is driven by a belt 76 from the pulley 31. At the other end of the shaft 71 and at the corresponding end of the shaft 72 there are provided pinions 77 and 78, which mesh with a large gear 79 mounted upon the end of a transverse cam shaft 80, journaled in the frame 10—10 beneath the rolls 73 and 74, the gear 79 being driven through rotation of the pinion 77, and in turn driving the shaft 72 and roll 74 in the same direction and equally to the rotation of the shaft 71 and roll 73.

At the inner side of the frames 10—10, and disposed between the shafts 71 and 72 there are provided vertically disposed tubular brackets 81 and 82, and in which there are slidably and non-rotatably mounted tubular posts 83 and 84, provided at their lower forked ends 85 and 86 with rollers 87 and 88, which ride upon cams 89 and 90 respectively provided upon the cam shaft 80. Nuts 91 and 92 are provided at the upper ends of the posts being held against rotation by vertical guide rods 91ª and 92ª having sliding engagement therewith and mounted on the brackets 81 and 82. The nuts are interiorly threaded and have engaged therein a pair of threaded shafts 93 and 94, having their upper ends rotatably mounted in the lower ends of yoke members 95 and 96, and provided within the yoke members with bevel gears 97 and 98 respectively, which mesh with bevel gears 99 and 100 provided upon a horizontal transverse shaft 101, journaled at its ends in the yoke members, said shaft being provided between said members with a loosely rotatable roll 102. One end of the shaft 101 is squared, as at 101ª, and may be engaged by a suitable wrench to rotate the shaft, this operation causing the threaded shafts 93 and 94 to be turned upwardly or downwardly in the tubular posts 83 and 84, to thereby raise or lower the roll 102 relatively to the rolls 73 and 74.

A cross bar 103, of square cross section, extends above the roll 102, being secured at its ends to the upper ends of the yoke members 95 and 96 and is provided with a plurality of removable weights 104, recessed as at 104ª, so that they may be lifted off when desired, and which serve to produce a downward pressure upon the roll 102. In operation the cams 89 and 90 periodically lift the roll 102 into spaced relation to the rolls 73 and 74, and while lifted, one of the canvas covered tubes B mounted upon its supporting mandrel A rolls into place upon the rolls 73 and 74, where it is rotated through the rotation of said rolls. The roll 102 is then lowered into engagement with the tube, the cam rollers 87 and 88 being free of the cams when so engaged, so that the weight produced upon the roll 102 by the weights 104 is placed upon the tube during its rotation beneath said roll 102. the rubber stock being thereby compressed and the canvas covering being tightly wrapped about the same.

The mechanism for automatically removing the tube after the rolling operation and for releasing another one to be rolled will now be described. At the inner sides of the rear uprights of the frames 10—10 there are provided bearing brackets 105 and 106, in which is journaled a transverse shaft 107, provided inwardly of each of said brackets with a lever 108. The mechanism at each side is identical, so that only one will be described. This lever 108 has arms extending both forwardly and rearwardly of the shaft 107, the rearwardly extending arm being disposed beneath the cam shaft 80 and provided intermediately its ends with a roller 109 engaging a cam 110 provided on the cam shaft, and being held in engagement therewith by means of a spring 111 coiled about the shaft 107 and bearing downwardly upon the forward arm of the lever.

The forward arm of the lever is connected by a link 112 to the end of a rock lever 113 pivotally mounted upon a bracket 114 secured to the under side of the frame 10. The ends of the rock lever are provided with upwardly disposed reciprocating stop members 115 and 116, the upper ends of which are guided in apertured bearings 117 and 118 secured to the table 19, the bearing 118 being in the form of a clamp secured about the edge of the table by a wing headed screw 119, engaged in one of a series of holes 119ª, so that the gearing may be adjusted to shift the stop member 116 in the slot 120 of the table, through which it projects toward or away from the upright 115 to accommodate different sized rolls. In operation the stop 115 is lowered to release the foremost roll held thereby, the roll moving by gravity into relation to the rolling mechanism, the stop 116 being at the same time raised to retain the next roll in place. The stop 115 is now raised, the simultaneous lowering of the stop 116 permitting the next roll to move into engagement with said stop 115, and in position to be released thereby, upon the next lowering movement thereof.

At each end of the roll 74, and loosely mounted upon the shaft 72 there is provided a star wheel 121, the projecting arms of which are adapted, upon the intermittent partial revolution of the wheels, to engage the ends of the tube mounting mandrel A, and while the roll 102 is raised out of engagement therewith, to lift the same out of engagement with the rolls 73 and 74, and place it upon the inclined receiving frame, where it rolls by gravity along the side angle bars 15—15. The hub 122 of the star wheel is provided with a ratchet 123, and has loosely mounted thereon a collar 124 carrying a pawl 125 engaging the ratchet, the collar being connected by a link 126 to the end of the lever 108, so that the oscillation of the lever imparts to and fro rotary movement to the collar, and the star wheel is thereby intermittently rotated through a partial revolution. In order to fix the position of the star wheel between its intermittent movements the same is provided in one side with a series of recesses 127 corresponding in spacing and number to the radial lifter arms, and yieldably engaged by a plunger 128 depressibly mounted in a cylindrical boss 129 provided upon the inner sides of the brackets 81 and 82, and pressed into engagement with the side of the star wheel by a spring 130. The end of the plunger is rounded, so that the rotation of the star wheel will disengage it from the recesses 127.

The angle irons 15—15 forming the sides of the inclined receiving frame are recessed as at 131 and 132 to embrace the star wheels, so that as the mandrels are lifted and ejected from the rolls, through rotation of the star wheels, the same are placed upon said angle irons and roll down the same, as before pointed out. The rolls collect upon the receiving frame and may be removed therefrom as desired, for subsequent vulcanizing, or other operations, and which do not form a part of the present invention.

Having thus described my invention, what I claim and desire to secure by Letters Patent is:

1. In a rubber tube wrapping machine, the combination with a frame, an inclined work table upon which rubber tubes are wrapped, a pair of operating rolls positioned adjacent the lower end of the table to receive wrapped tubes as they roll therefrom, a third roll positioned above said pair of rolls, means for raising and lowering said third roll into and out of engagement with the wrapped tubes, and means for adjustably raising and lowering said third roll independent of the above mentioned raising and lowering means to position said third roll to accommodate tubes of different diameters.

2. In a machine of the character described, a work table adapted to support a plurality of rubber tubes or the like upon mandrels to be rolled, means at one end of said table for rolling said tubes and including a pair of lower rolls, an upper pressure roll, means for intermittently raising and lowering said pressure roll, means adapted to remove the tube from said rolls during the raised period of said pressure roll, and means for releasing a tube into relation with said rolls during said raised period.

3. In a machine of the character described, a work table adapted to support a plurality of rubber tubes or the like upon mandrels to be rolled, means at one end of said table for rolling said tubes and including a pair of lower rolls, an upper pressure roll, removable weights adapted to exert pressure on said pressure roll, means for intermittently raising and lowering said pressure roll, means adapted to remove the tube from said rolls during the raised period of said pressure roll, and means for releasing a tube into relation with said rolls during said raised period.

4. In a machine of the character described, a work table adapted to support a plurality of rubber tubes or the like upon mandrels to be rolled, means at one end of said table for rolling said tubes and including a pair of lower rolls, an upper pressure roll, vertically reciprocating supporting means for said pressure roll, means for adjusting said pressure roll vertically relatively to said supporting means, means for intermittently raising and lowering said supporting means to raise and lower said pressure roll, means adapted to remove the tube from said rolls during the raised period of said pressure roll, and means for releasing a tube upon said table into relation with said rolls during said raised period.

5. In a machine of the character described, a work table adapted to support a plurality of rubber tubes or the like upon mandrels to be rolled, means at one end of said table for rolling said tubes and including a pair of lower rolls, an upper pressure roll, a pair of vertically reciprocating supporting means at each end of said roll, rotatable screws engaged in said supporting means and supporting said pressure roll, means for simultaneously rotating said screws for vertically adjusting said roll relatively to said supporting means, means for intermittently raising and lowering said supporting means to raise and lower said pressure roll, means adapted to remove the tubes from said rolls during the raised period of said pressure roll, and means for releasing a tube upon said table into relation with said rolls during said raised period.

6. In a machine of the character described, a work table adapted to support a plurality of rubber tubes or the like upon mandrels to be rolled, means at one end of said table for rolling said tubes and including a pair of lower rolls, a cam shaft, a gear mounted thereon, pinions at the ends of said rolls meshing with said gear whereby said cam shaft and rolls are rotated in synchronism, an upper pressure roll, cam means on said cam shaft for intermittently raising and lowering said pressure roll, means adapted to remove the tube from said rolls during the raised period of said pressure roll, and means for releasing a tube into relation with said rolls during said raised period.

7. In a machine of the character described, an inclined work table adapted to support a plurality of rubber tubes or the like upon mandrels to be rolled, means at one end of said table for rolling the tubes and including a pair of lower rolls, an upper pressure roll, means for intermittently raising and lowering said pressure roll, and means for releasing a tube into relation with said rolls during said raised period and including a pair of stop means respectively disposed in front of the first and second tubes on said table, and means adapted to alternately raise and lower said stops whereby the lowering of the first stop releases the first tube and the raising of the second stop retains the second tube, and the successive lowering of the second stop and raising of the first stop releases said second tube into relation with said first stop.

8. In a machine of the character described, an inclined work table adapted to support a plurality of rubber tubes or the like upon mandrels to be rolled, means at one end of said table for rolling the tubes and including a pair of lower rolls, an upper pressure roll, a cam shaft, cam means thereon adapted to intermittently raise and lower said pressure roll, and means for releasing a tube into relation with said rolls during said raised period and including a pair of stop means respectively disposed in front of the first and second tubes on said tables, and cam means on said cam shaft adapted to alternately raise and lower said stops whereby the lowering of the first stop releases the first tube and the raising of the second stop retains the second tube, and the successive lowering of the second stop and the raising of the first stop releases the second tube into relation with said first stop.

9. The invention as in claim 7, further characterized in that one of said stops is adjusted toward or away from the other to accommodate different diameter tubes.

10. The invention as in claim 8, further characterized by means for removing the tubes from said rolls during said raised period, and cam means on said shaft adapted to automatically operate said removal means.

11. In a machine of the character described, a work table adapted to support a plurality of rubber tubes or the like upon mandrels to be rolled, means at one end of said table for rolling said tubes and including a pair of lower rolls, an upper pressure roll, means for intermittently raising and lowering said pressure roll, a star wheel loosely mounted on one of said lower rolls and adapted upon partial rotation to remove the tubes from said rolls, and means adapted to intermittently partially rotate said star wheel during the raised period of said pressure roll.

12. In a machine of the character described, a work table adapted to support a plurality of rubber tubes or the like upon mandrels to be rolled, means at one end of said table for rolling said tubes and including a pair of lower rolls, an upper pressure roll, a cam shaft, cam means on said cam shaft adapted to intermittently raise and lower said pressure roll, a star wheel loosely mounted on one of said lower rolls and adapted upon partial rotation to remove the tubes from said rolls, and cam means on said cam shaft adapted to intermittently partially rotate said star wheel during the raised period of said pressure roll.

13. In a machine of the character described, an inclined work table, an inclined receiving rack in spaced relation thereto, means at the outer end of said work table for trimming rubber tubes or the like, means between said table and said rack for rolling said tubes, a driving connection between said trimming means and said rolling means, means on said work table for releasing said tubes into relation to said rolling means, means for removing said tubes from said rolling means to said rack, and means driven by said rolling means adapted to operate said releasing and removing means.

14. In a rubber tube wrapping machine, a work table upon which the tube is adapted to be wrapped, and adapted to support a plurality of successively arranged wrapped tubes, rolling means at one end of the table for rolling the wrapped tubes, and automatic means for periodically releasing a single wrapped tube to said rolling means.

15. In a rubber tube wrapping machine, a work table upon which the tube is adapted to be wrapped, and adapted to support a plurality of successively arranged wrapped tubes, rolling means at one end of the table for rolling the wrapped tubes, automatic means for periodically releasing a single wrapped tube to said rolling means, and automatic means for periodically delivering the rolled tubes from said rolling means.

16. In a rubber tube wrapping machine, a work table upon which the tube is adapted to be wrapped, and adapted to support a plurality of successively arranged wrapped tubes, rolling means at one end of the table for rolling the wrapped tubes, means for periodically releasing a single wrapped tube to said rolling means, means for periodically delivering the rolled tubes from said rolling means, and means for simultaneously operating said releasing and delivering means.

Signed at Bridgeport in the county of Fairfield and State of Connecticut this 14th day of July A. D., 1923.

WILLIAM NICHOLAS.